(12) United States Patent
Tezuka et al.

(10) Patent No.: US 6,442,121 B1
(45) Date of Patent: Aug. 27, 2002

(54) OPTICAL PICKUP DUST-PROOFING STRUCTURE

(75) Inventors: Keizo Tezuka; Takeshi Goto, both of Taito-ku (JP)

(73) Assignee: Aiwa Co., Ltd. (JP)

( * ) Notice: Subject to any disclaimer, the term of this patent is extended or adjusted under 35 U.S.C. 154(b) by 0 days.

(21) Appl. No.: 09/622,479
(22) PCT Filed: Mar. 20, 1998
(86) PCT No.: PCT/JP98/01208
  § 371 (c)(1),
  (2), (4) Date: Aug. 17, 2000
(87) PCT Pub. No.: WO99/49461
  PCT Pub. Date: Sep. 30, 1999
(51) Int. Cl.[7] .......................... G11B 33/02; G11B 17/04; G11B 17/08; G11B 23/00; G11B 25/00
(52) U.S. Cl. ....................... 369/75.1; 369/212; 369/258; 369/270
(58) Field of Search ................ 369/75.1, 117, 369/212, 258, 264, 270, 292; 360/97.02, 99.08, 99.12, 137

(56) References Cited

U.S. PATENT DOCUMENTS 6,219,327 B1 * 4/2001 Kim et al. ................. 369/244

FOREIGN PATENT DOCUMENTS

| EP | 60-29992 | 2/1985 |
| EP | 0 387 047 | 9/1990 |
| EP | 06-274915 | 9/1994 |
| EP | 7-111008 | 4/1995 |
| EP | 7-28275 | 10/1995 |
| EP | 9-69282 | 3/1997 |
| JP | 57-78647 | 5/1982 |
| JP | 3-44834 | 2/1991 |

* cited by examiner

Primary Examiner—Robert S. Tupper
Assistant Examiner—Julie Anne Watko
(74) Attorney, Agent, or Firm—Parkhurst & Wendel, L.L.P.

(57) ABSTRACT

An optical pickup dustproofing mechanism having a simple structure is provided in which an objective lens is shielded promptly and reliably and adhesion of dust or the like to the objective lens is prevented. A movable portion 34 is able to move along a shaft center direction of a clamper 26. Further, the movable portion 34 is connected to the clamper 26 so as to face a standby position of an optical pickup 20. When a disc 14 is not placed on a turn table 18, the movable portion 34 moves downwardly and shields the objective lens 22 positioned in the standby position. Since adhesion of dust or the like to the objective lens 22 is prevented, the amount of light transmitted onto a photodetector does not decrease and reading failure is prevented. Since the present invention is simply structured such that the movable portion 34 is connected to the clamper 26, as compared to a conventional dustproofing mechanism, the number of components decreases and the structure is simplified. The dustproofing mechanism becomes low cost and failures are minimized.

8 Claims, 9 Drawing Sheets

OPTICAL PICKUP DUST-PROOFING STRUCTURE

FIELD OF THE INVENTION

The present invention relates to an optical pickup dustproofing mechanism applied to a disc device, comprising: a turn table on which a disc such as a compact disc or the like is placed; an optical pickup, which provides an objective lens for converging light on a disc and which moves in a radial direction with the turn table as a center point; and a chucking member, which is disposed so as to correspond to the turn table and which clamps the disc in a horizontal direction with the turn table. More particularly, the present invention rotates to an optical pickup dustproofing mechanism that prevents adhesion of dust or the like to the objective lens positioned in a standby position.

DESCRIPTION OF THE RELATED ART

For example, among sound apparatuses such as radio cassette recorders having disc devices or the like, there are sound apparatuses in which a disc device is disposed at an upper portion of the sound apparatus. The cover of the disc device is disposed at an upper panel of a main body of the sound apparatus, and a storing portion storing therein a disc is opened or closed due to rotation of this cover.

When the cover of the disc device is open, dust or the like floating in the air (which is simply referred to as "dust" hereinafter) enters into the storing portion and may adhere to an objective lens of an optical pickup. If dust adheres to the objective lens, the amount of light transmitted from the objective lens and the amount of light reflected from the disc decreases, which may cause reading failure (regeneration failure) of a photodetector, which detects signals from reflected light.

Therefore, among conventional disc devices, in order to prevent adhesion of dust or the like to the objective lens, there are provided some disc devices in which a shielding member is disposed at an upper portion of the optical pickup, and stoppers and springs for controlling operation of this shielding member are also provided (refer to Japanese Patent Application Laid-Open (JP-A) No. 6-274915). In this dustproofing mechanism, when the optical pickup is withdrawn to its standby position, the shielding member rotates toward a side of the objective lens so as to shield the objective lens.

However, in the above-described dustproofing mechanism of the optical pickup, since it is necessary to provide the stoppers and the springs in addition to the shielding member, the number of components increases and a structure becomes more complicated, which may cause increased costs and failures. Further, in a case of a portable disc device or the like, the optical pickup positioned in the standby position may move due to a receiving a strong impact, and a problem may be caused wherein the shielding member is held in an open state.

In view of the aforementioned facts, it is an object of the present invention to provide an optical pickup dustproofing mechanism having a simple structure in which an objective lens is shielded promptly and reliably so as to prevent adhesion of dust or the like to the objective lens.

DISCLOSURE OF THE INVENTION

A first embodiment of the present invention is an optical pickup dustproofing mechanism applied to a disc device, comprising: a turn table on which a disc is placed; an optical pickup which provides an objective lens for converging light on the disc and which moves in a radial direction with the turn table as a center point; and a chucking member which is disposed so as to correspond to the turn table and which clamps the disc in a horizontal direction between the turn table and the chucking member; wherein the optical pickup dustproofing mechanism has a dustproofing member movable along a substantially shaft center direction of the chucking member, and is connected to the chucking member so as to face a standby position the optical pickup.

In accordance with the first embodiment of the present invention, when the disc is placed on the turn table, the dustproofing member abuts the disc, and in this state, the disk is played back or recorded upon. Meanwhile, in a case in which the disc is not placed on the turn table, the dustproofing member moves along the substantially shaft center direction of the chucking member so as to shield the objective lens positioned in the standby position.

In accordance with the first embodiment of the present invention, since adhesion of dust or the like to the objective lens is prevented, for example, the amount of light transmitted onto a photodetector does not decrease and reading failure is prevented. Further, in accordance with the present invention, a structure is adopted wherein the dustproofing member is simply connected to the chucking member, as compared to a conventional dustproofing member, the number of components decreases, the structure is simplified, the dustproofing mechanism of the optical pickup becomes low cost, and failures are minimized.

Further, in accordance with the first embodiment, in a case in which a strong impact acts on the disc device, simply by a movable portion moving vertically, adhesion of dust or the like to the objective lens is reliably prevented since the movable portion moves downwardly due to its own weight and shields the objective lens.

A second embodiment includes an optical pickup dustproofing mechanism, wherein the dustproofing member includes an extending piece formed at a fixing portion of the chucking member and a movable portion disposed so as to be able to move with respect to the extending piece.

A third embodiment includes an optical pickup dustproofing mechanism, wherein concave-convex portions are formed on respective surfaces facing each other of the extending piece of the fixing portion and of the movable portion, so as to be symmetrical with each other.

Since the concave-convex portions are formed on the respective surfaces facing each other of the extending piece and of the movable portion so as to be symmetrical with each other, the concave-convex portion of the movable portion is guided by the concave-convex portion of the extending piece, and the extending piece and the movable portion are positioned in a state in which the concave-convex portions of the movable portion and of the extending piece correspond to each other. Therefore, in accordance with the third embodiment of the present invention, the movable portion engages with the extending piece promptly and precisely, and therefore, looseness of the movable portion when the disc rotates can be prevented.

In a fourth embodiment, an optical pickup dustproofing mechanism, wherein the circumferential cross-sectional configuration of each of the concave-convex portions is formed in a V-shape.

In a fifth embodiment, an optical pickup dustproofing mechanism, wherein the disc is a compact disc.

A sixth embodiment of the present invention is an optical pickup dustproofing mechanism applied to a disc device, comprising: a turn table on which a disc is placed; an optical pickup which provides an objective lens for converging light on the disc and which moves in a radial direction with the turn table as a center point; and a chucking member which is disposed so as to correspond to the turn table and which clamps the disc in a horizontal direction between the turn table and the chucking member; wherein the optical pickup dustproofing mechanism has a dustproofing member movable along a substantially shaft center direction of the chucking member, and is connected to the chucking member so as to face a standby position of the optical pickup, and further comprises urging means which urges the dustproofing member toward a side of the optical pickup and which is provided between the dustproofing member and the chucking member.

Since the dustproofing mechanism is formed merely by the dustproofing member which is disposed at the chucking member and the urging means which urges the dustproofing member toward the optical pickup, as compared to a conventional dustproofing mechanism, the number of components decreases, the structure is simplified, the dustproofing mechanism of the optical pickup becomes low cost, and failures are minimized. Further, the dustproofing mechanism of the present invention can be applied to a type of disc device in which the disc is clamped in a perpendicular (vertical) direction between the chucking member and the turn table. When a strong impact acts upon the disc device, since the dustproofing member is urged toward the side of the optical pickup by the urging means and shields the objective lens, adhesion of dust or the like to the objective lens is reliably prevented.

A seventh embodiment includes an optical pickup dustproofing mechanism, wherein the urging means is a coil spring.

An eighth embodiment includes an optical pickup dustproofing mechanism, wherein the disc is a compact disc.

PREFERRED EMBODIMENTS FOR IMPLEMENTING THE PRESENT INVENTION (First Embodiment)

Figure 1:
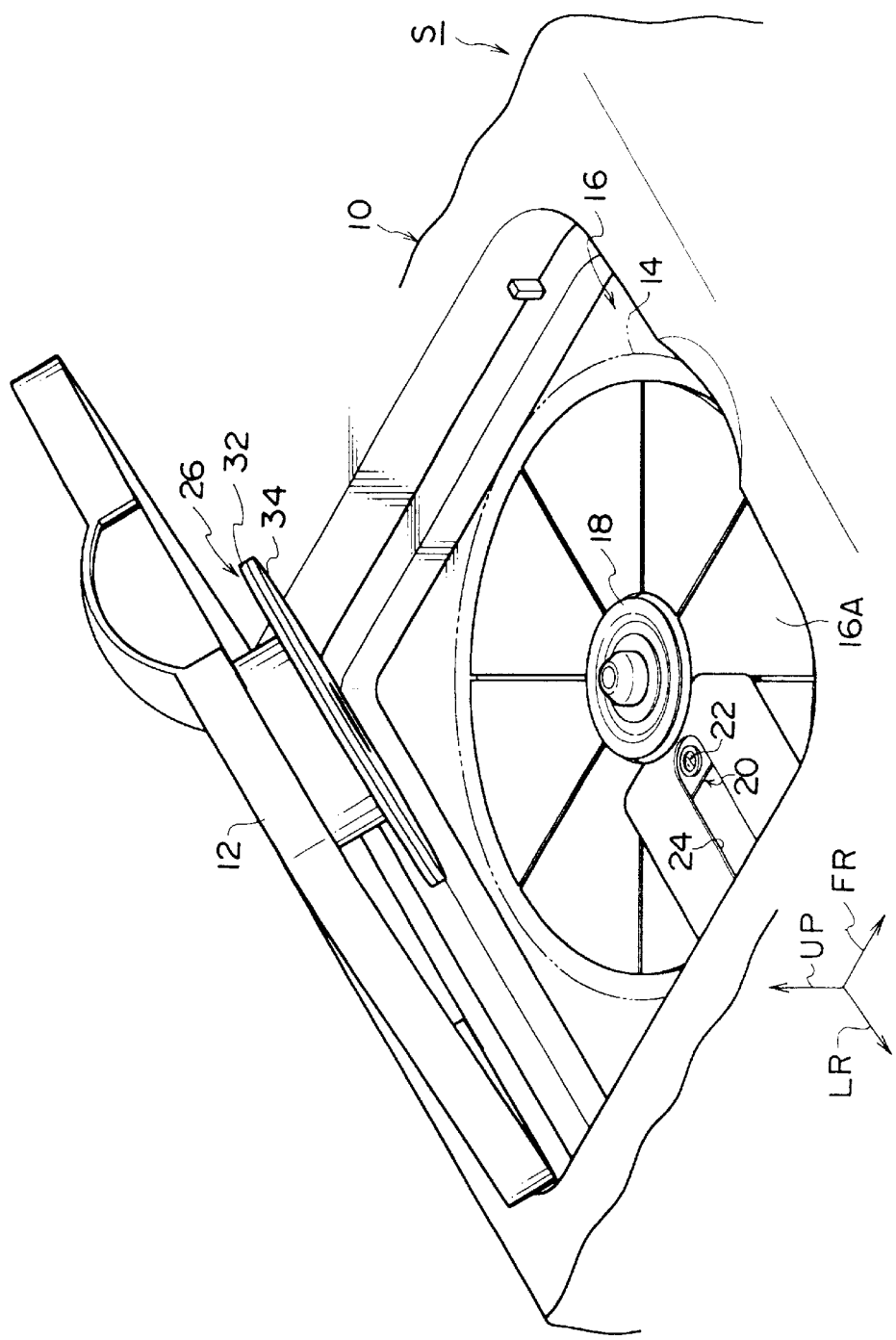
FIG. 1 is a perspective view illustrating a disc device according to a first embodiment of the present invention in a state in which a cover of the disc device is open.
Figure 2:
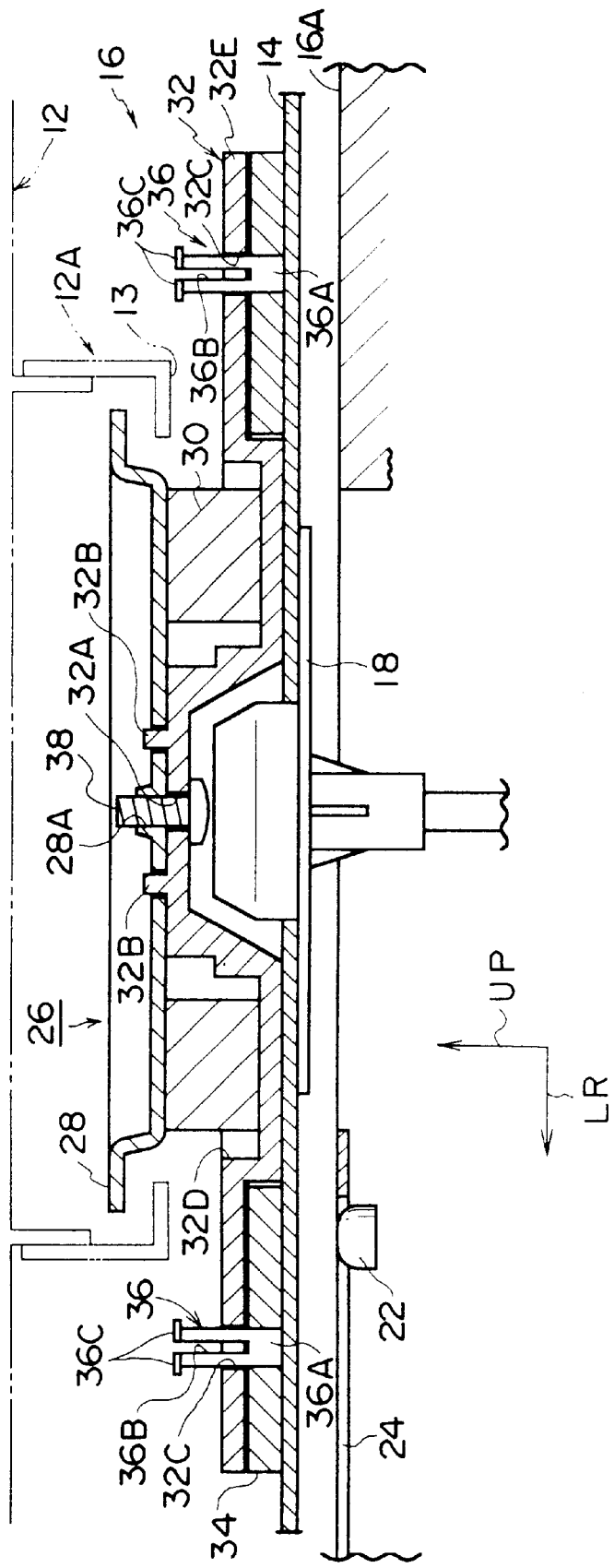
FIG. 2 is a cross-sectional view illustrating a compact disc in a state in which the compact disc is being chucked when the cover shown in FIG. 1 is closed.
Figure 3:
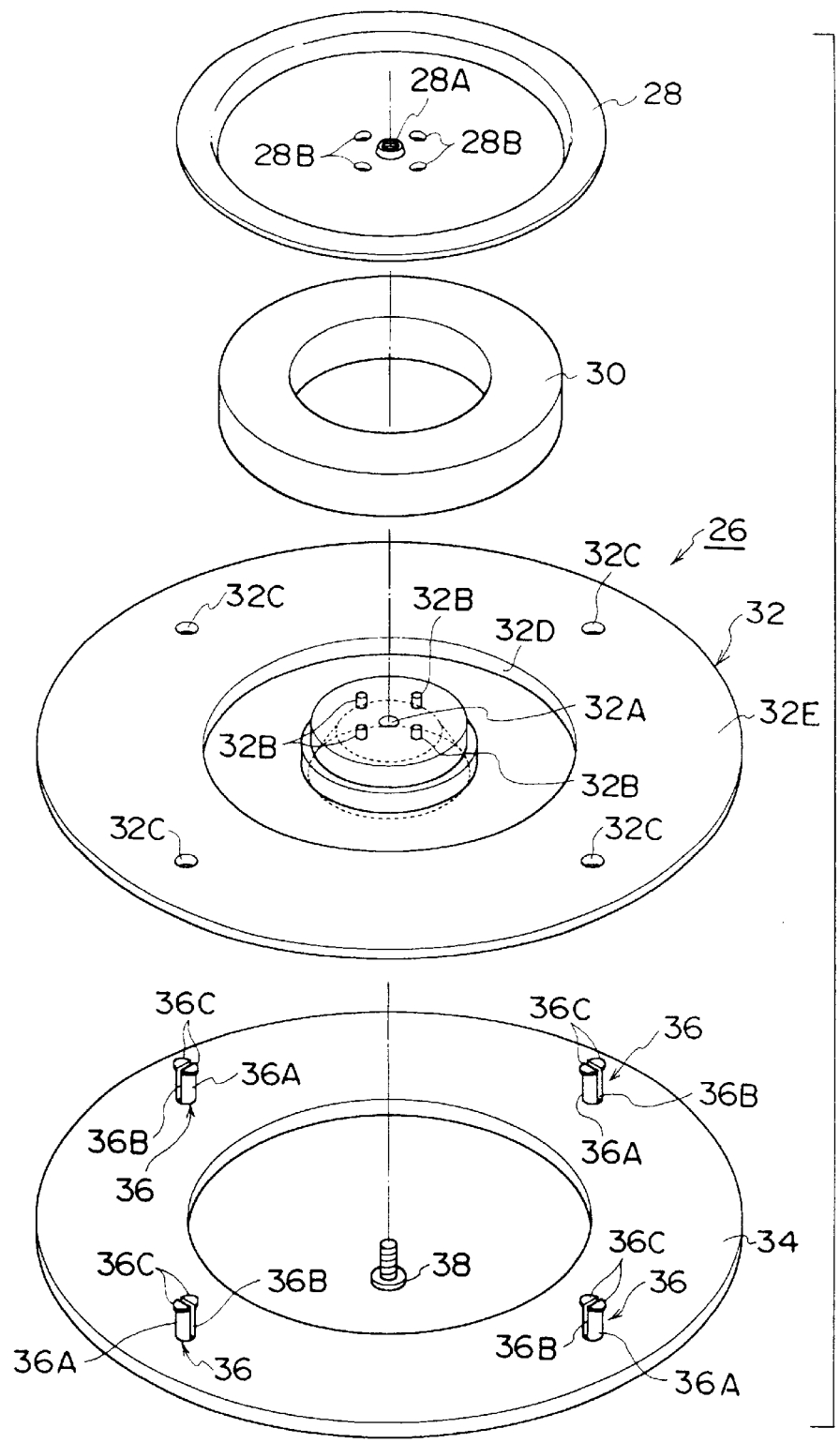
FIG. 3 is an exploded perspective view illustrating the dustproofing mechanism shown in FIG. 1.
Figure 4:
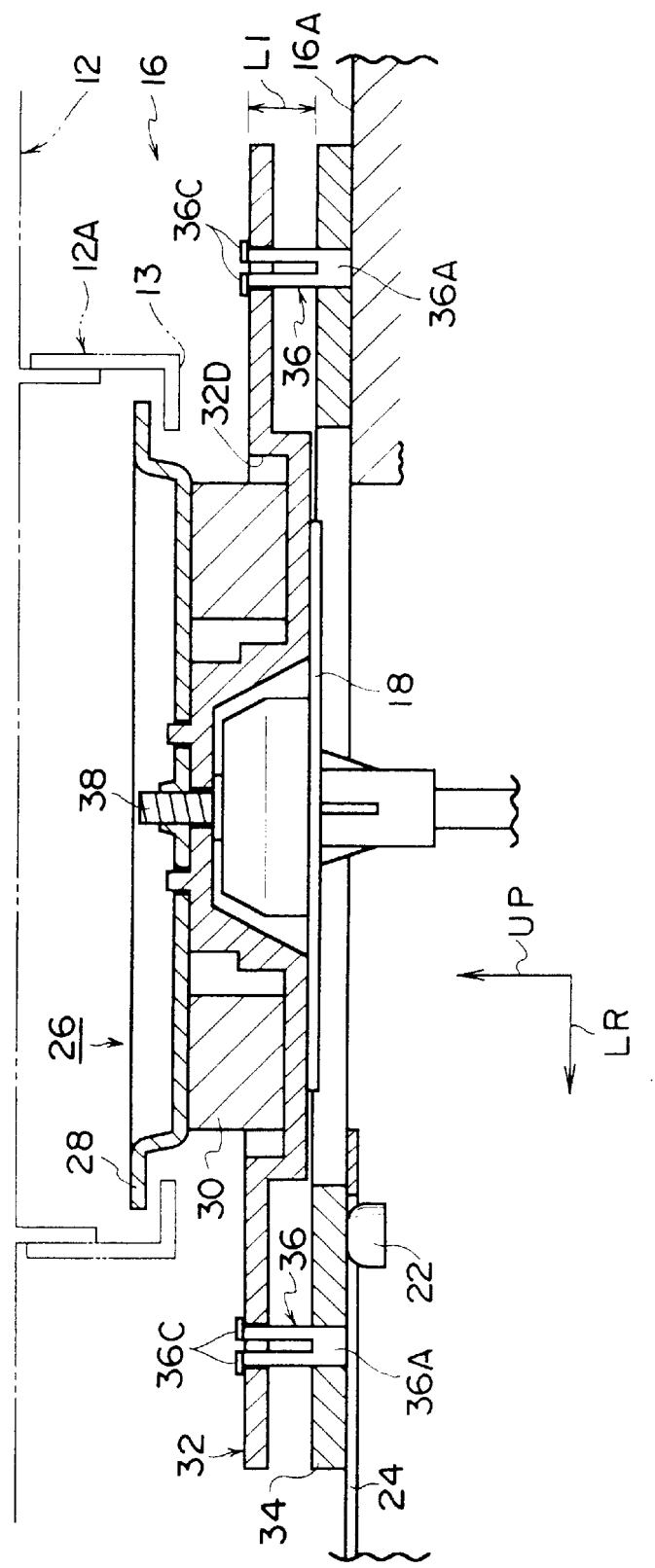
FIG. 4 is a cross-sectional view illustrating a dustproofing mechanism in a case in which a disc is not disposed at a storing portion shown in FIG. 2.

An optical pickup dustproofing mechanism according to a first embodiment of the present invention is shown in FIGS. 1 to 4. FIG. 1 is a perspective view illustrating a disc device in a state in which a cover of the disc device is open. FIG. 2 is a cross-sectional view illustrating a compact disc (it is simply referred to as a "disc" hereinafter) in a state in which the disc is being chucked when the cover of the disc device is closed. FIG. 3 is an exploded perspective view of a dustproofing mechanism. FIG. 4 is a cross-sectional view illustrating a state of the dustproofing mechanism in a case in which the disc is not disposed at a storing portion.

Further, the sound apparatus according to the present embodiment is one in which the disc device, a radio cassette recorder and the like are equipped. Further, the disc device is of a type in which the disc is clamped in a horizontal direction. In these figures, arrow FR indicates a front side of the apparatus, arrow LR indicates a left side, and arrow UP indicates an upper side.

As shown in FIG. 1, a disc device 10 is disposed at an upper portion of a sound apparatus S. A cover 12 is disposed at the disc device 10 so as to rotate on a hinge (not shown). The cover 12 in a closed state is substantially flush with an upper panel of the sound apparatus S. Due to rotation of the cover 12, a storing portion 16 which stores therein a disc 14 (which is indicated by an imaginary line in FIG. 1) is opened or closed.

The storing portion 16 is provided at the upper portion of the sound apparatus S so as to form a recess. A turn table 18 is disposed at a substantially central portion of the storing portion 16 so as to be rotatable. An optical pickup 20, which irradiates laser light, is disposed at a left side of the storing portion 16. An objective lens 22, which converges light on the disc 14, is disposed at this optical pickup 20. Further, an elongated hole 24 whose lengthwise direction is a left/right direction is formed in a radial direction with the turn table 18 as a center point. The optical pickup 20 moves along the elongated hole 24 in the radial direction from a standby position, which is shown in FIG. 1, i.e., from a side of the turn table 18, and information that has been recorded into the disc 14 is played back.

A clamper 26 as a chucking member is disposed at the cover 12 so as to face the turn table 18. This clamper 26 is able to float with respect to a holder portion 12A, which is shown in FIG. 2. Namely, as shown in FIG. 3, the clamper 26 includes: a disc-shaped base plate 28 disposed so as to face a stopper 13 of the holder portion 12A, the cross section of the stopper 13 being formed in an L-shape (see FIG. 2); a doughnut-shaped magnet 30, a disc-shaped fixing portion 32; and a doughnut-shaped movable portion 34, which forms a portion of a dustproofing member.

A screw hole 28A is formed at a central portion of the base plate 28. Four engaging holes 28B are formed so as to be spaced apart from each other at 90° angles with the screw hole 28A as a center point. An insertion hole 32A is formed at the central portion of the fixing portion 32 so as to face the screw hole 28A. Engaging protruding portions 32B are formed so as to face the engaging holes 28B. Further, an extending piece 32E, which forms a portion of a dustproofing member, is formed at an outer periphery of the fixing portion 32 so as to be integrally formed therewith. Four circular engaging holes 32C are formed in the extending portion 32E so as to be spaced apart from each other at 90° angles, with the insertion hole 32A as a center point.

A recessed portion 32D is formed in the fixing portion 32 between a central portion and the extending piece 32E. The magnet 30 is disposed in a state in which the magnet 30 is positioned in the recessed portion 32D. Namely, the magnet 30 is held in a state in which the magnet 30 is clamped by the base plate 28 and the fixing portion 32.

The movable portion 34 is formed so as to correspond to the extending piece 32E of the fixing portion 32. Substantially cylindrically-shaped stoppers 36 are formed in the movable portion 34 so as to face the engaging holes 32C. A slit 36B is provided at each shaft portion 36A of each of the stoppers 36 in vertical directions thereof. Each of the shaft portions 36A are split into two by a slit 36B. Bulging portions 36C at distal ends of the shafts 36A bulge in radial directions from shaft centers of the shaft portions 36A.

The shaft portions 36A are inserted into the engaging holes 32C and the bulging portions 36C are made to protrude from the fixing portion 32. Accordingly, the stoppers 36 do not become detached from the fixing portion 32. Further, even if rotational force is applied to the movable portion 34, displacement of the movable portion 34 from the fixing portion 32 can be prevented.

As shown in FIG. 4, the length L1 of the shaft portions 36A (i.e., the length of a portion of the shaft portion 36A that protrudes from the movable portion 34 to the top surface of the fixing portion 32) is formed such that the movable portion 34 abuts the bottom plate 16A of the storing portion 16 when the cover 12 is closed in a state in which the disc 14 (see FIG. 2) is not placed on the turn table 18. Namely, the movable portion 34 is disposed so as to be able to move vertically with respect to the fixing portion 32. Further, when the movable portion 34 abuts the bottom plate 16A of the storing portion 16, the movable portion 34 faces the objective lens 22 of the optical pickup 20 (see FIG. 1), which is positioned in a standby position shown in FIGS. 1 and 4, and shields the objective lens 22.

In the clamper 26, the shaft portions 36A of the stoppers 36 are inserted into the engaging holes 32C of the fixing portion 32 such that the movable portion 34 does not become detached from the fixing portion 32. Further, in a state in which the magnet 30 is clamped between the base plate 28 and the fixing portion 32, the engaging protrusions 32B of the fixing portion 32 are inserted into the engaging holes 28B of the base plate 28, and the portion of the fixing portion 32 with respect to the base plate 28 is determined. In this state, a screw 38 is inserted into the insertion hole 32A of the fixing portion 32 and is fastened to a screw hole 28A of the base plate 28. As a result, the clamper 26 is formed.

An operation of the present embodiment will be explained, hereinafter. First, in the present embodiment, as shown in FIG. 1, after the cover 12 has been opened, the disc 14 is placed on the turn table 18 and the cover 12 is closed. Next, as shown in FIG. 2, a bottom surface of the recessed portion 32D of the fixing portion 32 abuts the disc 14. The disc 14 is clamped due to the magnetic force of the magnet 30 with respect to the turn table 18 and the movable portion 34 is held in a state in which the movable portion 34 abuts the disc 14. Namely, because the movable portion 34 is able to move vertically with respect to the fixing portion 32, even when the disc 14 is placed on the turn table 18, the disc 14 is not hindered by the movable portion 34.

Next, as shown in FIG. 4, when the cover 12 is closed in a state in which the disc 14 is not placed on the turn table 18, the movable portion 34 facing the objective lens 22 of the optical pickup 20 positioned in the standby position moves downwardly due to its own weight and abuts the bottom plate 16A of the storing portion 16. Namely, according to the present embodiment, the movable portion 34 moves together with opening or closing movements of the cover 12 and shields the objective lens 22. Accordingly, adhesion of dust or the like to the objective lens 22 can be prevented. For example, the amount of light transmitted onto the photodetector does not decrease and reading failure can be prevented.

Further, according to the present embodiment, because the dustproofing member is structured only by the extending piece 32E of the fixing portion 32 and the movable portion 34, which are disposed at the clamper 26, as compared to a conventional dustproofing member, the number of components used decreases, the structure is simplified, and modification of structural portions other than the clamper 26 becomes unnecessary. Therefore, according to the present embodiment, the dustproofing mechanism of the optical pickup 20 becomes low cost and failures are minimized. Moreover, according to the present embodiment, when a strong impact acts upon the disc device, simply as a result of the movable portion 34 moving vertically, adhesion of dust or the like to the objective lens 22 can be prevented because the movable portion 34 moves downwardly due to its own weight and shields the objective lens 22.

A dust test is carried out in a state in which a pair of clampers 26 which are each provided with the movable portion 34 according to the present embodiment are disposed or in a state in which a pair of clampers 26 which are not provided with the movable portion 34 according to the present embodiment are disposed. The results were such that the amount of dust or the like adhered to the objective lens 22 in the clampers 26 each providing the movable portion 34 is smaller than the clampers 26 that do not provide the movable portion 34. Namely, even when the positions of the clampers 26 each providing the movable portion 34 are changed arbitrarily, excellent results can be obtained in that the amount of dust or the like adhered to the objective lens 22 is small. As a result, it was recognized that dustproof effects can be obtained through providing the movable portion 34 at the clamper 26.

(Second Embodiment)

Figure 5:
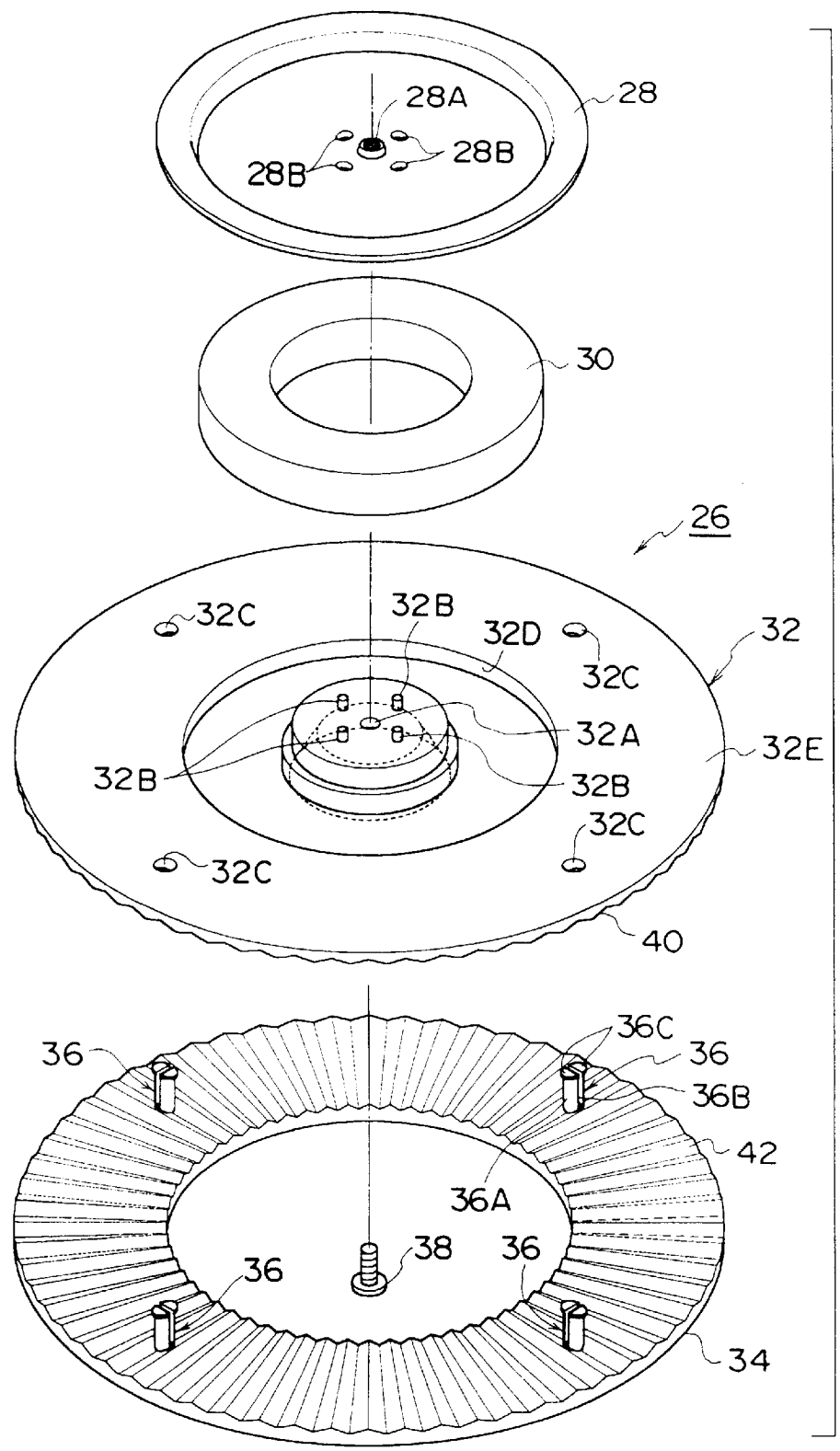
FIG. 5 is an exploded perspective view illustrating a dustproofing mechanism according to a second embodiment of the present invention.

An optical pickup dustproofing mechanism according to a second embodiment of the present invention is shown in FIG. 5. FIG. 5 is an exploded perspective view of a dustproofing mechanism. Further, in FIG. 5, portions identical to those in FIG. 3 are denoted by the same reference alphabetical numerals, and a detailed description thereof will be omitted.

In the present embodiment, concave-convex portions 40 and 42, each of whose cross-sectional configurations are substantially formed in V-shapes in a circumferential direction, are formed on the respective surfaces facing each other, of the extending piece 32E of the fixing portion 32 and of the movable portion 34, which form a dustproofing mechanism. The concave-convex portions 40 and 42 are formed so as to be symmetrical with each other. Accordingly, the concave-convex portion 40 of the extending piece 32E and the concave-convex portion 42 of the movable portion 34 engage with each other.

Namely, according to the present embodiment, since the concave-convex portions 40 and 42 are formed so as to be symmetrical, on the surfaces facing each other of the extending piece 32E of the fixing portion 32 and of the movable portion 34, respectively, the concave-convex portion 42 of the movable portion 34 is guided by the concave-convex portion 40 of the extending piece 32E. The concave-convex portions 40 and 42 of the movable portion 34 and of the extending piece 32E, respectively, are positioned in a state in which they correspond to each other. Therefore, according to the present embodiment, since the movable portion 34 engages with the extending piece 32E promptly and accurately, looseness of the movable portion 34 when the disc 14 rotates can be prevented. Other structures and effects of operation of the present embodiment are the same as that of the first embodiment, so a description thereof will be omitted. Further, in the present embodiment, the circumferential cross-sectional configuration of each of the concave-convex portions 40 and 42 are formed in the V-shapes. However, even if the concave-convex portions of the present invention have a wave-pattern form, application in the same manner is possible.

(Third Embodiment)

Figure 6:
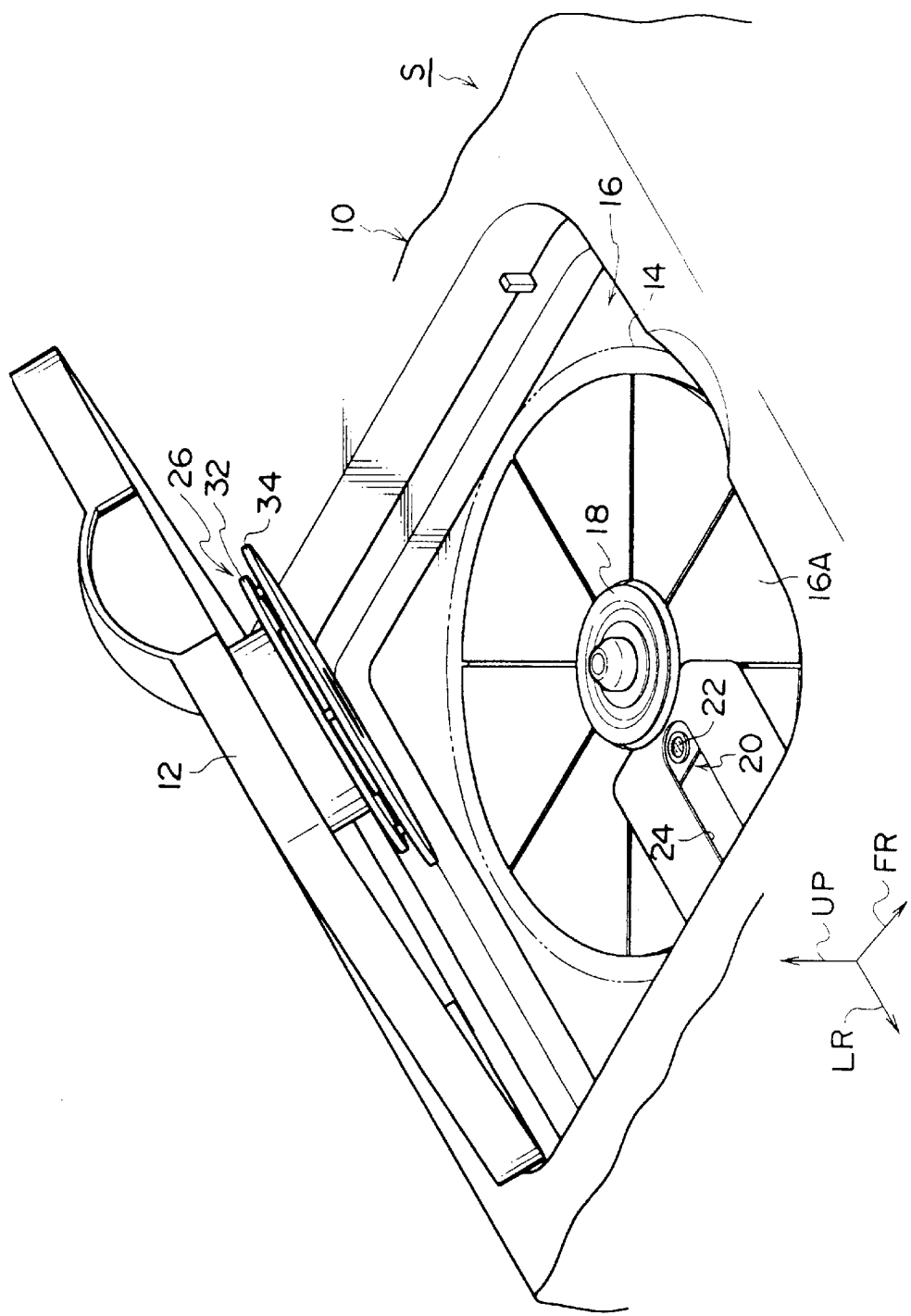
FIG. 6 is a perspective view illustrating a disc device according to a third embodiment of the present invention in a state in which a cover of the disc device is open.
Figure 7:
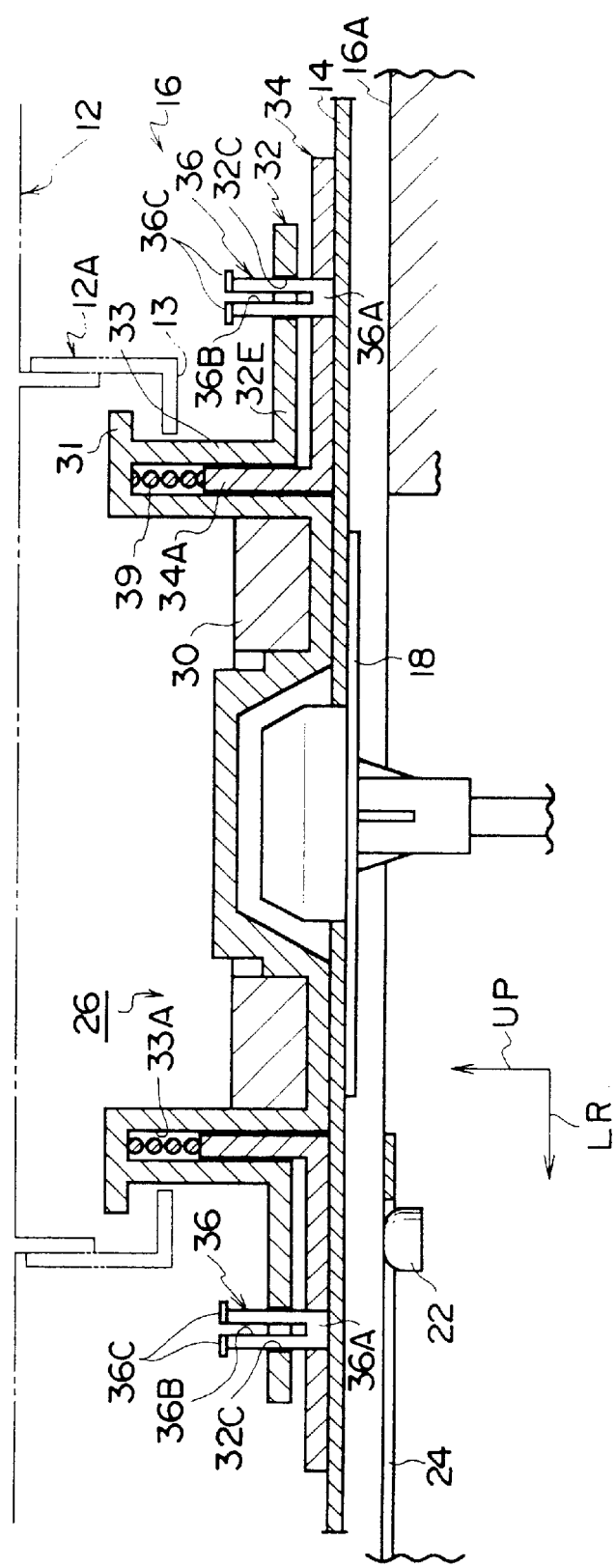
FIG. 7 is a cross-sectional view illustrating a compact disc in a state in which the compact disc is being chucked when the cover shown in FIG. 6 is closed.
Figure 8:
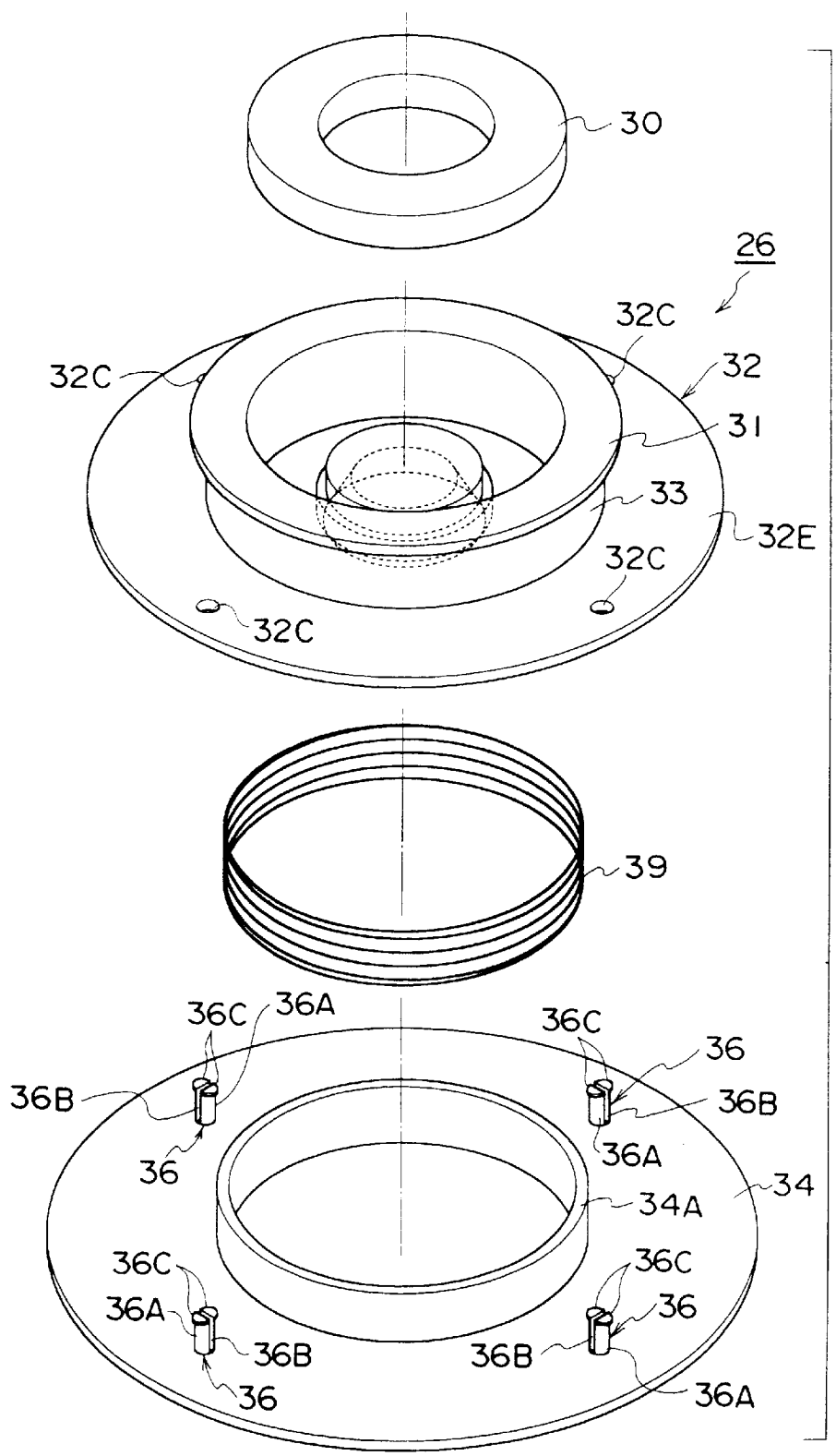
FIG. 8 is an exploded perspective view illustrating a dustproofing mechanism shown in FIG. 6.
Figure 9:
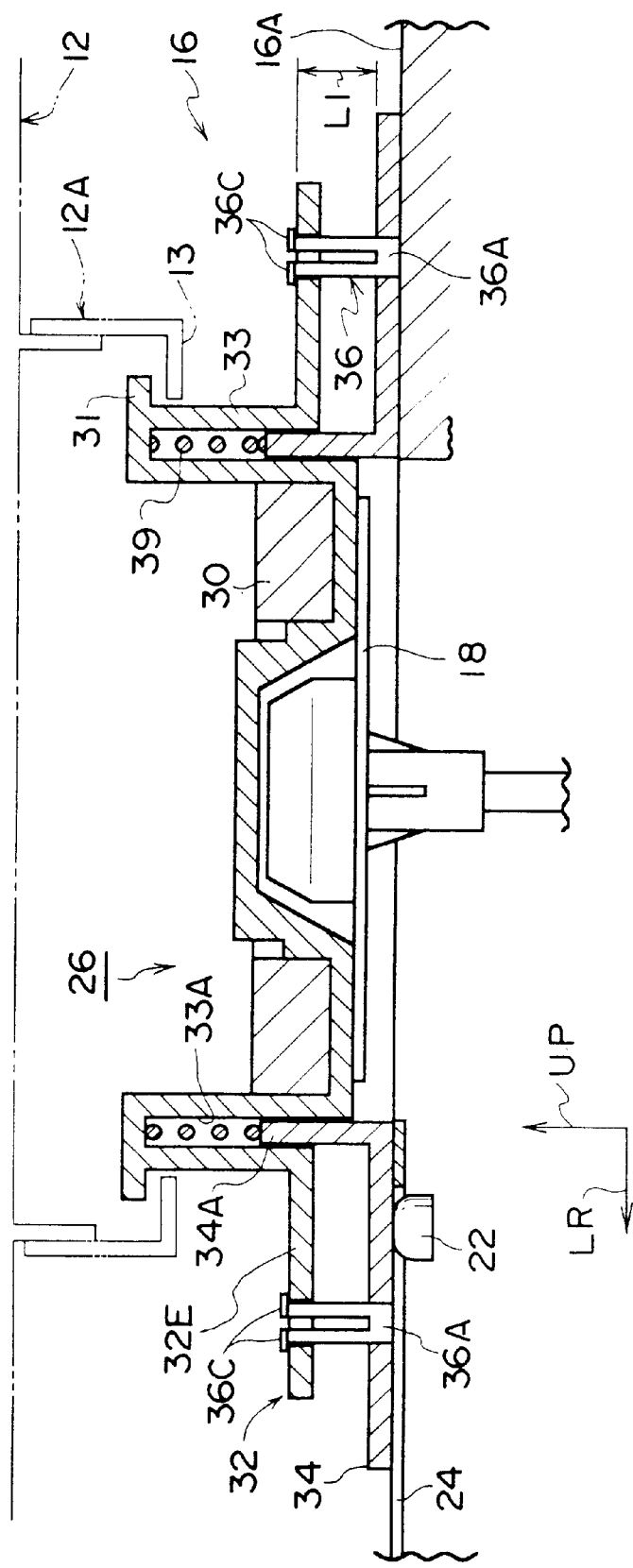
FIG. 9 is a cross-sectional view illustrating a state of a dustproofing mechanism in a case in which the disc is not disposed at a storing portion shown in FIG. 7.

An optical pickup dustproofing mechanism according to a third embodiment of the present invention is shown in FIGS. 6 to 9. FIG. 6 is a perspective view illustrating a disc device in a state in which a cover of the disc device is open. FIG. 7 is a cross-sectional view illustrating a compact disc (which is simply referred to as a "disc" hereinafter) in a state in which the compact disc is being chucked when the cover is closed. FIG. 8 is an exploded perspective view of a dustproofing mechanism. FIG. 9 is a cross-sectional view illustrating a state of the dustproofing mechanism in a case in which the disc is not placed in a storing portion. In FIGS. 6 to 9, portions identical to that of FIGS. 1 to 4 are denoted by the same reference alphabetical numerals and a detailed description thereof will be omitted.

A holding portion 33 for holding the magnet 30 is disposed so as to protrude from the fixing portion 32. The magnet 30 is fixed in the holding portion 33 by adhesives or the like. A hook portion 31, which opposes the stopper 13 of the holder portion 12A, the cross section of the stopper 13 being formed in an L-shape, is provided at a tip end portion of the holding portion 33 so as to extend in a radial direction of the fixing portion 32. Further, as shown in FIG. 7, a storage space 33A for storing a coil spring 39 as urging means is formed at the holding portion 33. The coil spring 39 is stored in the storage space 33A.

Further, as shown in FIG. 7, an abutting piece 34A is provided so as to protrude upwardly from the movable portion 34 in a right-angle form and to face the storage space 33A of the fixing portion 32. The abutting piece 34A is inserted into the storage space 33A in a state in which the abutting piece 34A abuts the coil spring 39.

Next, an operation of the present embodiment will be explained. First, in the present embodiment, as shown in FIG. 6, after the cover 12 has been opened, the disc 14 is placed on the turn table 18 and the cover 12 is closed. Then, as shown in FIG. 7, a bottom surface of the recessed portion 32D of the fixing portion 32 abuts the disc 14 and the disc 14 is clamped by the magnetic force of the magnet 30 with respect to the turn table 18, and the movable portion 34 is held in a state in which the movable portion 34 abuts the disc 14. Moreover, in this state, the coil spring 39 in the storage space 33A is in a compressed state.

Next, as shown in FIG. 9, when the cover 12 is closed in a state in which the disc 14 is not placed on the turn table 18, the movable portion 34, which faces the objective lens 22 of the optical pickup 20 positioned in the standby position, moves downwardly due to its own weight an due to the urging force from the coil spring 39, and then abuts the bottom plate 16A of the storing portion 16. Namely, according to the present embodiment, the movable portion 34 can reliably shield the objective lens 22 due to the urging force from the coil spring 39, adhesion of dust or the like to the objective lens 22 can be prevented, the amount of light transmitted onto the photodetector does not decrease, and reading failure can be prevented.

According to the present embodiment, since the dustproofing mechanism is structured only by the movable portion 34 and the coil spring 39, as compared to a conventional dustproofing mechanism, the number of the components decreases, the structure is simplified, and modification of structural portions other than the clamper 26 becomes unnecessary. Further, according to the present embodiment, even when a strong impact acts upon the disc device, since the movable portion 34 is urged toward a side of the objective lens 22 by the urging force from the coil spring 39, the movable portion 34 can shield the objective lens 22 and adhesion of dust or the like to the objective lens 22 can be reliably prevented.

Further, in the present embodiment, play back is carried out in a state in which the disc 14 is held in a horizontal state. However, in a manner similar to the present embodiment, a type in which a disc is clamped in a perpendicular (vertical) direction between a clamper and a turn table can be applied to the present invention. Namely, since the movable portion 34 is constantly urged toward the side of the optical pickup 20 by the coil spring 39, even in a case in which the disc is clamped in the vertical direction, the objective lens 22 can be reliably shielded.

Further, in the present embodiment, the coil spring 39 is used as urging means. However, provided that the urging means of the present invention urges the dustproofing member toward the side of the optical pickup, a plate spring or the like other than the aforementioned coil spring, can be applied in the same manner.

Further, although the extending piece 32E is provided at the fixing portion 32 so as to correspond to the movable portion 34 in each of the above-described embodiments, it is also possible to adopt a structure wherein a supporting piece is provided at the fixing portion 32 so that the movable portion 34 can move vertically, without forming the extending piece 32E at the fixing portion 32. Further, in each of the above-described embodiments, a dustproofing mechanism has been described in which adhesion of dust or the like to the optical pickup 20 for a compact disc is prevented. However, in the same manner as in the above-described embodiments, the optical pickup of any type of disc (for example, an optical video disc or the like) can be applied to the dustproofing mechanism according to the present invention.

Further, in each of the above-described embodiments, the cover 12 is structured so as to be rotated on a hinge. However, a structure of a drawer-type of tray or the like is also possible. Further, the disc device according to the present invention includes a portable type of disc device in addition to a stationary type thereof.

INDUSTRIAL AVAILABILITY

As described above, the optical pickup dustproofing mechanism according to the present invention is used preferably as the dustproofing mechanism of the optical pickup for reading information that has been recorded on a compact disc, and is more preferably used as the optical pickup dustproofing mechanism that shields the objective lens positioned in the standby position.

What is claimed is:

1. An optical pickup dustproofing mechanism in a disc device, said disc device comprising:

a turn table rotatable about an axis through its center point and for supporting and rotating a disc;

an optical pickup having an objective lens for converging light on a disc, said optical pickup for moving in a radial direction with respect to said axis;

a chucking member coaxial with said turn table and for clamping an optical disc between said turn table and said chucking member; and a dustproofing member movable along a direction substantially parallel to said axis and connected to said chucking member so as to face a standby position of said optical pickup.

2. An optical pickup dustproofing mechanism according to claim 1, wherein said dustproofing member includes an extending piece formed at a fixing portion of said chucking member and a movable portion disposed so as to be able to move with respect to said extending piece.

3. An optical pickup dustproofing mechanism according to claim 2, wherein said extending piece and said movable portion include mating concave-convex portions formed on respective facing surfaces thereof.

4. An optical pickup dustproofing mechanism according to claim 3, wherein each said concave-convex portions has a V-shaped cross-sectional configuration.

5. An optical pickup dustproofing mechanism according to claim 1, wherein said disc is a compact disc.

6. An optical pickup dustproofing mechanism in a disc device, said disc device comprising:

a turn table rotatable about an axis through its center point and for supporting and rotating a disc;

an optical pickup having an objective lens for converging light on a disc, said optical pickup for moving in a radial direction with respect to said axis;

a chucking member coaxial with said turn table and for clamping an optical disc between said turn table and said chucking member; and a dustproofing member movable along a direction substantially parallel to said axis and connected to said chucking member so as to face a standby position of said optical pickup, and urging means for urging said dustproofing member toward a side of said optical pickup and located between said dustproofing member and said chucking member.

7. An optical pickup dustproofing mechanism according to claim 6, wherein said urging means is a coil spring.

8. An optical pickup dustproofing mechanism according to claim 6, wherein said disc is a compact disc.

* * * * *

UNITED STATES PATENT AND TRADEMARK OFFICE
CERTIFICATE OF CORRECTION

PATENT NO.    : 6,442,121 B1
DATED         : August 27, 2002
INVENTOR(S)   : Keizo Tezuka and Takeshi Goto It is certified that error appears in the above-identified patent and that said Letters Patent is hereby corrected as shown below:

<u>Title page,</u>
Item [56], References Cited, FOREIGN PATENT DOCUMENTS, change "EP" to -- "JP-A" -- at "© 387047" reference;
Change "EP" to -- JP-A -- at "06-274915" reference;
Change "EP" to -- JP-A -- at "7-111008" reference;
Change "EP" to -- JP-A 7-282575 -- at "7-28275" reference;
Change "EP" to -- JP-A -- at "9-69282" reference.

Signed and Sealed this

Seventh Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,442,121 B1
DATED          : August 27, 2002
INVENTOR(S)    : Keizo Tezuka and Takeshi Goto It is certified that error appears in the above-identified patent and that said Letters Patent is hereby corrected as shown below:

<u>Title page,</u>
Item [56], References Cited, FOREIGN PATENT DOCUMENTS, change "EP" to -- JP-A -- at "60-29992" reference; and change "JP-A" back to -- EP -- at "0 387 047" reference.

Signed and Sealed this

Thirteenth Day of May, 2003

JAMES E. ROGAN
*Director of the United States Patent and Trademark Office*